No. 770,187. Patented September 13, 1904.

UNITED STATES PATENT OFFICE.

GIOVANNI B. RAFFETTO, OF NEW YORK, N. Y.

PROCESS OF PRESERVING MAROONS.

SPECIFICATION forming part of Letters Patent No. 770,187, dated September 13, 1904.

Application filed August 2, 1904. Serial No. 219,195. (No specimens.)

*To all whom it may concern:*

Be it known that I, GIOVANNI B. RAFFETTO, a citizen of the United States, and a resident of the city of New York, borough of Manhattan, in the county and State of New York, have invented a new and useful Improvement in the Process of Preserving Maroons; and I do hereby declare the following to be a full, clear, and exact description of the same.

Maroons, as is well known, belong to the same class of nuts as chestnuts and when properly cooked form a very nutritious and palatable food. Heretofore in the process of cooking the same it has been customary to merely remove the outer shells from the nuts, leaving the inner skins or pericarps on the nut-kernels, and to cook them in this condition in boiling water. In this process, however, quite a percentage of the nuts become disintegrated and unsalable, and hence very material loss results.

The object of my invention is to cook the kernels in such manner that their original form will be preserved, thereby enhancing their value and eliminating the loss due to disintegration. To accomplish this object, I remove the shells, as is customary, and preferably also the inner skins or pericarps, thereby obtaining the clean kernels. The kernels are wrapped or incased individually in a suitable protective covering of cloth or paper, preferably parchment-paper. The nuts might be cooked in this condition; but I prefer to place the kernels thus wrapped in a large bag or sack or other receptacle, preferably made of cloth, and then subject them to the cooking operation.

It will be observed that the main object of my invention is to cook the nuts under such condition that they will not be subject to the abrading or disintegrating action caused by the boiling water and the attrition of the nuts on each other.

The invention will be fully understood from the following detailed description thereof, wherein also other advantages than those specified will be apparent.

In carrying out my process in detail and in its preferred form I first remove the shells from the nuts, leaving the inner skins or pericarps intact. I then dip them in boiling water, which operation loosens the inner skins and enables them to be readily removed. The clean kernels thus obtained are incased individually in a wrapping of parchment-paper. They are then placed severally in an outer container, preferably of some flexible material which will allow water to circulate therethrough freely, as cheese-cloth, though it will be understood that such container might be made of paper, wire-mesh, or other material. The receptacle or container is then placed in water and heated for sufficient time to thoroughly cook the nuts. After the cooking operation is completed the receptacle or container is taken out of the water, the cooked kernels removed therefrom, and the individual wrappers taken off the kernels. It will be found that they have been preserved intact and present an attractive appearance. They may be subsequently dipped in syrup or candied like "glacé fruit" or treated in any of the customary or usual ways.

It will be obvious that my process is not restricted to the treatment of maroons, but may be availed of in the cooking of various other analogous products.

Having thus fully described my invention, what I claim as new, and desire to secure by Letters Patent, is—

1. The process of cooking nuts which consists in incasing the nuts individually in a suitable flexible material to prevent them from disintegrating, then placing them severally in a suitable fabric, and then subjecting them thus doubly incased to the operation of boiling.

2. The process of cooking nuts which consists in wrapping the nuts individually in parchment-paper, and then boiling them.

3. The process of cooking nuts which consists in incasing the kernels individually in parchment-paper, then placing the kernels thus wrapped in a cloth container, and then boiling them.

4. The process of treating nuts which consists in removing their outer shells, then subjecting the kernels with their attached pericarps or skins to boiling water, whereby the pericarps are loosened, removing the pericarps, placing the kernels in individual parchment containers, then placing the containers in a suitable fabric receptacle, placing the receptacle and its contents in boiling water, and finally boiling the incased kernels.

5. The process of treating nuts which consists in placing the cleaned kernels in individual wrappers of parchment-paper, placing the kernels thus wrapped in a cloth container severally, then boiling them while incased, and then dipping the cooked nuts in syrup.

6. The process of treating nuts which consists in removing their shells, then treating the kernels with their attached pericarps with hot water to loosen the latter, then removing the pericarps, then incasing the kernels in individual protecting-containers of parchment-paper, placing the incased kernels in an outer wrapping of cloth, and then boiling the kernels in their double incasement.

GIOVANNI B. RAFFETTO.

Witnesses:
JAS. H. GRIFFIN,
CHARLES SCHIELE.